(12) United States Patent
Sipila et al.

(10) Patent No.: US 10,132,400 B2
(45) Date of Patent: Nov. 20, 2018

(54) DIFFERENTIAL MOUNTING SYSTEM

(71) Applicant: Ford Global Technologies, LLC, Dearborn, MI (US)

(72) Inventors: Darren Sipila, Royal Oak, MI (US); Mathew Leonard Hintzen, Stockbridge, MI (US); Charles Raymond Kvasnicka, Grosse Ile, MI (US); Charles Krysztof, Canton, MI (US); David Krenk, Canton, MI (US); Marc Thomas Wilkins, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 215 days.

(21) Appl. No.: 15/000,387

(22) Filed: Jan. 19, 2016

(65) Prior Publication Data

US 2017/0204961 A1 Jul. 20, 2017

(51) Int. Cl.
| | | |
|---|---|---|
| *B60K 5/02* | (2006.01) | |
| *B60K 17/16* | (2006.01) | |
| *B60K 17/348* | (2006.01) | |
| *F16H 57/025* | (2012.01) | |
| *F16H 57/037* | (2012.01) | |
| *B60K 17/344* | (2006.01) | |

(52) U.S. Cl.
CPC ............ *F16H 57/025* (2013.01); *B60K 5/02* (2013.01); *B60K 17/165* (2013.01); *B60K 17/344* (2013.01); *B60K 17/348* (2013.01); *F16H 57/037* (2013.01); *B60Y 2410/10* (2013.01)

(58) Field of Classification Search
CPC ... F16H 57/025; F16H 57/037; B60K 17/344; B60K 17/348; E05C 1/002; E05C 1/16
See application file for complete search history.

(56) References Cited

U.S. PATENT DOCUMENTS

| | | | | |
|---|---|---|---|---|
| 5,195,608 A | * | 3/1993 | Morikawa | B60K 5/04 123/195 AC |
| 5,303,798 A | * | 4/1994 | Nakamura | B60K 5/02 180/292 |
| 5,529,297 A | * | 6/1996 | Sawdon | B25B 5/068 269/239 |
| 5,755,145 A | * | 5/1998 | Iwata | F02B 67/06 74/603 |
| 7,575,088 B2 | | 8/2009 | Mir et al. | |

(Continued)

FOREIGN PATENT DOCUMENTS

| | | |
|---|---|---|
| GB | 1023229 A | 3/1966 |
| JP | S60240521 A | 11/1985 |

(Continued)

*Primary Examiner* — Jacob S. Scott
*Assistant Examiner* — Lillian T Nguyen
(74) *Attorney, Agent, or Firm* — Julia Voutyras; Brooks Kushman P.C.

(57) ABSTRACT

According to one embodiment, a vehicle powertrain includes an engine having a first locking feature defining first mating surfaces, and a differential coupled to a transfer case via a driveshaft. The differential includes a second locking feature defining second mating surfaces. The first and second locking features are engaged such that the first and second mating surfaces are disposed against each other connecting the engine and the differential. A fastener is disposed within the engine and the differential.

19 Claims, 5 Drawing Sheets

(56) References Cited

U.S. PATENT DOCUMENTS

| | | |
|---|---|---|
| 7,656,016 B2 | 2/2010 | Yoshimatsu et al. |
| 7,931,557 B2 | 4/2011 | Zink |
| 2008/0029942 A1 | 2/2008 | Kern |
| 2012/0235375 A1* | 9/2012 | Kudla .................... B62D 21/11 280/124.109 |
| 2013/0146383 A1* | 6/2013 | Kim ........................ B60K 5/12 180/292 |

FOREIGN PATENT DOCUMENTS

| | | |
|---|---|---|
| JP | S6198628 A | 5/1986 |
| JP | 2001322442 A | 11/2001 |

\* cited by examiner

DIFFERENTIAL MOUNTING SYSTEM

TECHNICAL FIELD

The present disclosure relates to a motor vehicle having a differential mounted to an engine.

BACKGROUND

Vehicles include a powertrain for providing torque to one or more driven wheels of the vehicle. The powertrain may be operable to selectively send torque to the front wheels, the rear wheels, or both depending upon operating conditions.

SUMMARY

According to one embodiment, a vehicle powertrain includes an engine having a first locking feature defining first mating surfaces, and a front differential coupled to a transfer case via a driveshaft. The front differential includes a second locking feature defining second mating surfaces. The first and second locking features are engaged such that the first and second mating surfaces are disposed against each other connecting the engine and the differential. A fastener is disposed within the engine and the differential.

According to another embodiment, a vehicle powertrain includes an engine having an outer side with a female locking feature defining internal mating surfaces, and a front differential coupled to a transfer case by a driveshaft. The front differential includes a housing having a male locking feature projecting therefrom and disposed within the female locking feature such that external mating surfaces of the male locking feature are engaged with the internal mating surfaces of the female locking feature to connect the differential to the engine.

According to yet another embodiment, a vehicle powertrain includes an engine having an outer side with a male locking feature projecting therefrom and defining external mating surfaces, and includes a differential coupled to a transfer case by a driveshaft. The differential includes a housing having a female locking feature defining internal mating surfaces. When assembled, the male locking feature is disposed within the female locking feature such that the male and female mating surfaces engage connecting the differential to the engine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
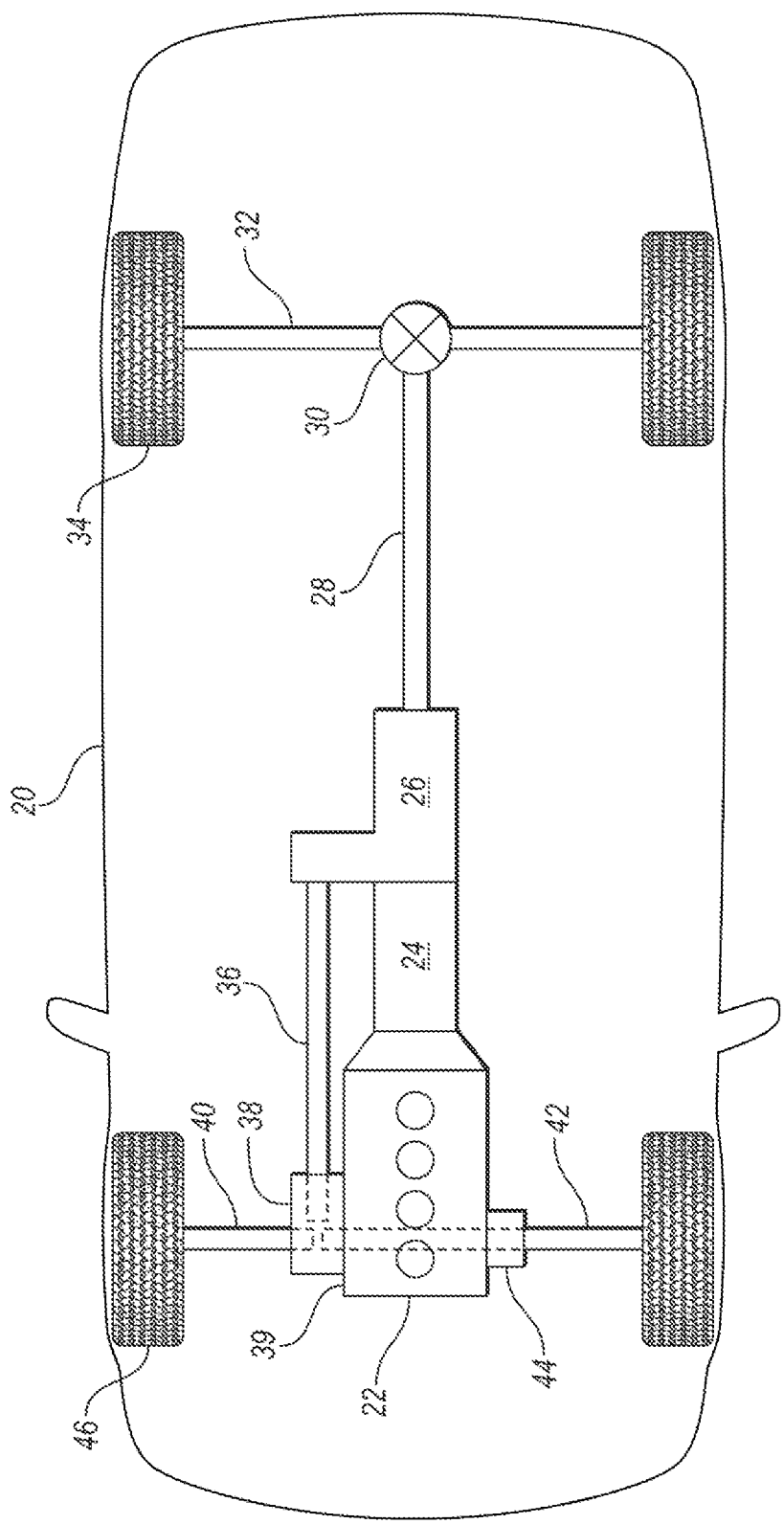
FIG. 1 is a schematic illustration of an example vehicle.

Referring to FIG. 1, a vehicle 20 (such as an all-wheel-drive vehicle or a four-wheel-drive vehicle) may include an engine 22 having at least a cylinder block and a cylinder head attached to a top of the block. A crankshaft and pistons are disposed within the cylinder block. A flywheel, of the engine 22, is connected to the crankshaft and is disposed on a backside of the engine 22. The engine 22 may be longitudinally mounted (i.e. the crankshaft runs in the lengthwise direction of the vehicle) or may be transversely mounted (i.e. the crankshaft runs in the crosswise direction of the vehicle). A transmission 24 is mounted to the back of the engine 22 and includes an input shaft that is operably coupled to the flywheel.

A transfer case 26 is mounted to the backside of the transmission 24 and is operably coupled to an output shaft of the transmission 24. The transfer case 26 is configured to selectively provide torque to the front wheels 46 and/or the rear wheels 34 depending upon operating conditions of the vehicle 20. The transfer case 26 sends torque to the rear wheels 34 via a rear driveshaft 28. The driveshaft 28 may extend from the transfer case 26 to the rear differential 30. The rear differential 30 is operably coupled to the rear wheels 34 via one or more rear axle half shafts 32. The transfer case 26 sends torque to the front wheels 46 via a front driveshaft 36. The driveshaft 36 may extend from the transfer case 26 to a front differential 38. The front differential 38 is operably coupled to the front wheels 46 via one or more front axle half shafts. For example, the front axle may include a passenger-side half shaft 40 that connects between the front differential 38 and the passenger-side front wheel, and a driver-side half shaft 42 that connects between the front differential 38 and the driver-side front wheel. In the illustrated embodiment, the front differential 38 is mounted on a passenger-side outer wall 39 of the engine 22 and the driver-side half shaft 42 extends through an axle tunnel defined within the engine 22. A support housing 44 may be disposed on the other side of the engine to support the driver-side half shaft 42. Alternatively, the front differential 38 can be mounted on a driver-side of the engine 22 and the passenger-side half shaft extends through the engine 22.

The front differential may be mounted to several different surfaces of the engine depending upon the layout of the powertrain and the design of the engine. Internal combustion engines come in many varieties: traditionally, engine assemblies had a one-piece block including the cylinders, crankcase, and oil pan mounting surfaces, but more recently, modular systems (such as ladder-frame engines) have been used. In a ladder-frame engine, the cylinder-block assembly is split into multiple components including the cylinder block and a structural frame.

Figure 2:
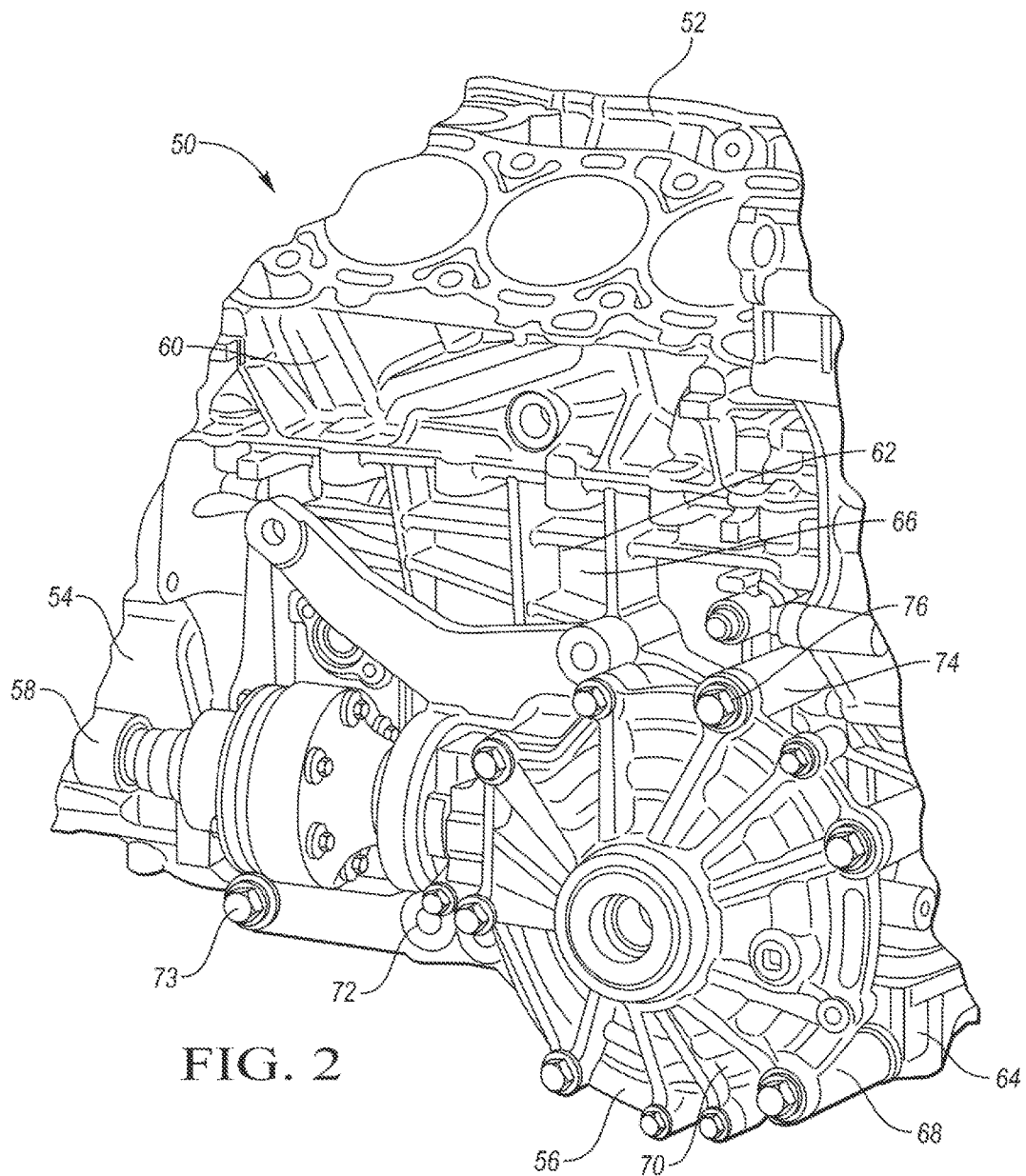
FIG. 2 is a perspective view of an example vehicle powertrain.

Referring to FIG. 2, an example powertrain 50 includes an engine 52, a transmission 54, a front differential 56, a transfer case (not shown), and a front driveshaft 58 that cooperate as described above. In one example embodiment, the engine 52 is a ladder-frame engine including a cylinder block 60, a structural frame 62, and an oil pan 64. The structural frame 62 defines an outer sidewall 66 to which the front differential 56 may be attached.

The front differential 56 may include a housing 68 that mounts to the engine 52 and a cover 70. The front differential 56 also includes gearing that is operably coupled to the front drive shaft 58. The housing 68 defines a plurality of mounting bores 72 that align with a plurality of bosses 74 defined on the sidewall 66. A plurality of mechanical fasteners 73 (e.g., bolts) are received through the mounting bores 72 and thread into the tapped holes 76 defined in the bosses 74. In some embodiments, the oil pan 64 may also define bosses that receive fasteners for attaching the differential 56 to the oil pan 64 in addition to the engine. Here, the oil pan may be a cast component capable of providing structural support, as opposed to traditional thin-walled, stamped-steel oil pans, which are not structural members.

The fasteners 73 collectively have a clamp load that acts against the torque load through the front differential to prevent the front differential 56 from moving relative to the engine. If the torque load through the front differential exceeds the clamp load, the differential 56 will twist relative to the engine 52, which is an unacceptable condition. The clamp load can be increased by increasing the size or number of the fasteners. But, powertrain packaging constraints may limit the size and number of the fasteners used to connect the front differential 56 to the engine 52. Unless exotic materials are used for the fasteners, the size and number of the fasteners set the clamp-load limit. Additional locking features between engine 52 and the differential 56 may be used in conjunction with the fasteners 73 to increase the robustness of the engine-differential connection while maintaining or reducing the size of the engine-differential connection.

Figure 3:
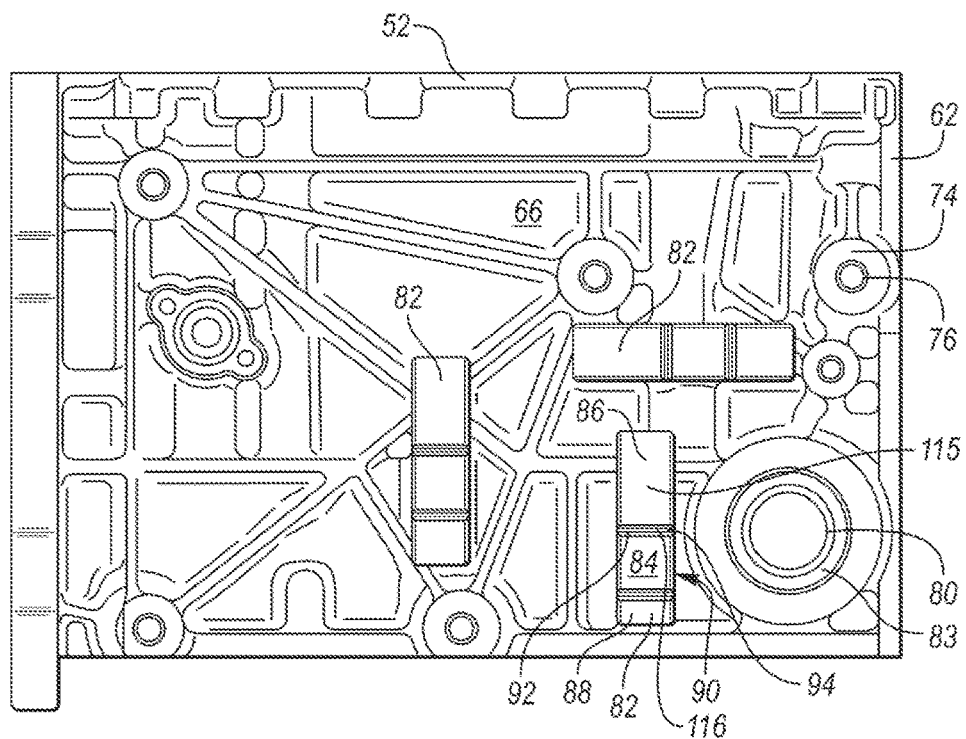
FIG. 3 is a side view of a side wall of an engine of the vehicle powertrain shown in FIG. 2.
Figure 4:
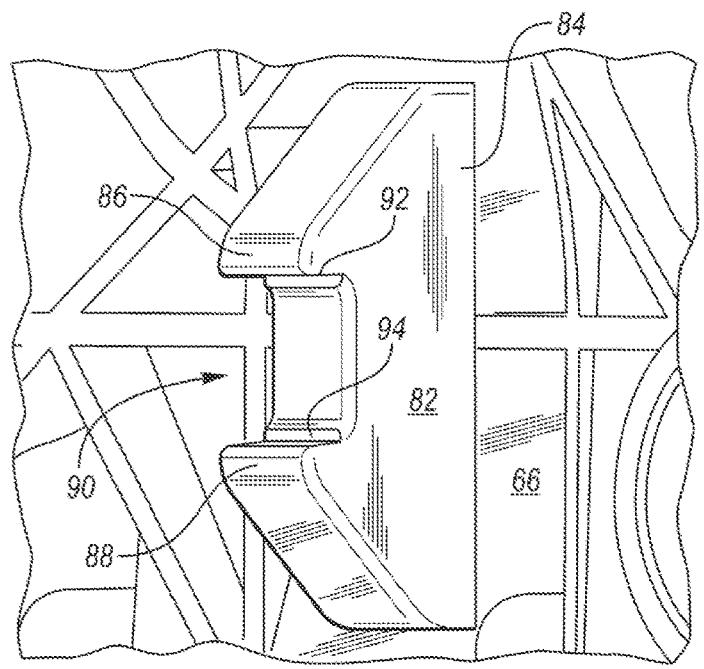
FIG. 4 is a perspective view of a side wall of an engine of the vehicle powertrain shown in FIG. 2.

FIGS. 3 and 4 illustrate magnified views of the sidewall 66 of the engine 52. The sidewall 66 defines a plurality of bosses 74 that have tapped holes 76. The sidewall also defines an axle tunnel 80 that extends completely through the frame 62 below the crankshaft and above the oil pan. The driver-side half shaft may extend through the axle tunnel 80. The axle tunnel 80 may define a seat 83 that engages with a portion of the front differential 56 when installed.

A plurality of first locking features 82, which are female locking features in the illustrated embodiment, is disposed on the sidewall 66. Each of the locking features 82 may include a base 84 that is disposed against the sidewall 66, a first arm 86 that extends outwardly from the base 84, and a second arm 88 that also extends outwardly from the base 84 generally forming a C-shaped component. The first and second arms 86, 88 are spaced apart to define an open cavity 90 that receives a corresponding locking feature of the differential. A surface of the base 84 forms a back wall of the cavity 90. In some embodiments, the first locking features 82 are integrally formed with the engine.

Figure 5:
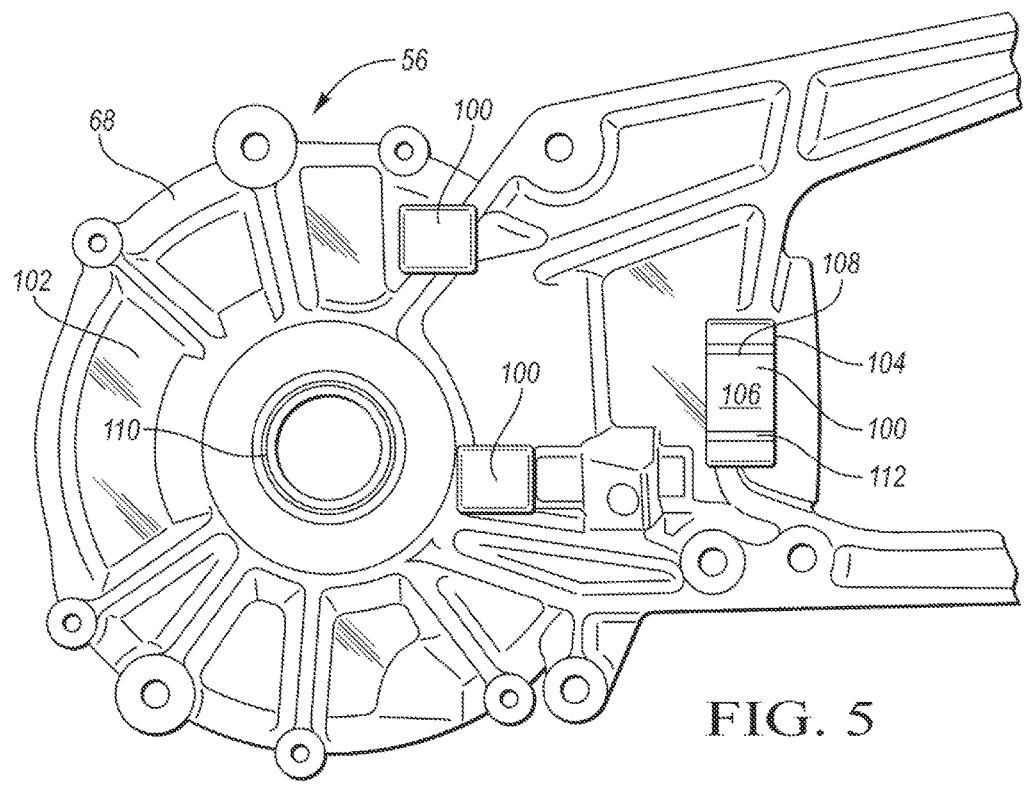
FIG. 5 is a side view of a front differential of the powertrain shown in FIG. 2.

FIG. 5 illustrates the differential housing 68 having second locking features 100 disposed on the interior side 102 of the housing. The interior side 102 is opposite the cover 70 and faces the engine 52 when the differential is installed. In the illustrated embodiment, the second locking features 100 are male features (or projections) that extend outwardly from the interior side 102 and are received within the cavity 90 of the first locking features 82. Each of the male locking features 100 includes a base 104 connected to the interior sidewall 102, a distal end 106, and sidewalls 108 extending between the base 104 and the distal end 106. In the illustrated embodiment, the projection 100 has a prismatic cube-like shape with a top and four sidewalls, but this disclosure is not limited to this particular shape. In some embodiments, the second locking features 100 are integrally formed with the differential housing 68. The interior side 102 also includes a front-axle bore 110 that receives one of the front half shafts.

Figure 6:
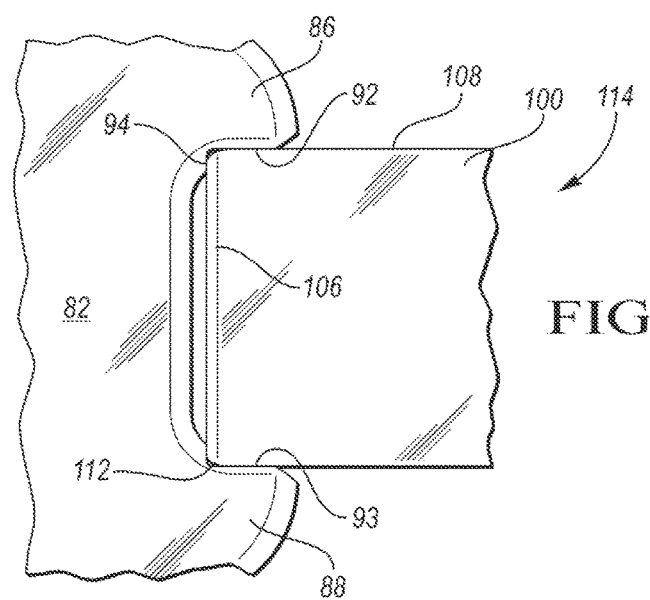
FIG. 6 is a side view of a connection between an engine and a front differential.

Referring to FIG. 6, a side view of the connection 114 between the first and second locking features 82, 100 is shown. The cavity 90 of the female locking feature 82 receives the distal end 106 and a portion of the sidewalls 108 therein. The first and second arms 86, 88 each define an internal engaging (or mating) surface 92 that engages with external engaging (or mating) surfaces 93 of the sidewalls 108. The first and second arms also include steps 94 that are raised relative to the engaging surfaces 92 and engage with the distal end 106 to prevent the male locking feature 100 from proceeding further into the cavity 90. The male locking feature 100 may include a beveled edge 112 at the distal end 106 allowing the male locking feature 100 to be more easily be received within the cavity 90. The locking features are sized such that a friction fit is created between the engaging surfaces 92 and corresponding sidewalls 108. The interference between the locking features may be adjusted depending upon embodiment to create a tighter or looser interference fit. Because the differential is also attached to the engine with fasteners, a loose interference fit may be all that is required to ensure that the differential is stationary to the engine. In one embodiment, the spacing between the arms is equal to the diameter of the projection 100.

A majority of the reaction forces for each connection 114 is in a direction normal to the engagement surfaces 92. As such, multiple locking features having different orientations may be used to ensure that the differential is supported in both up-and-down and left-and-right directions. In the illustrated example of FIGS. 4 and 5, three connections 114 are used. Two of the three connections have horizontal engagement surfaces, which resist up-and-down movement, and one of the connections has engagement surfaces that are vertical, which resists left-and-right movement. One of the connections, connection 115, has an upper engagement surface 116 that is vertically aligned with the longitudinal center line of the axle tube 80 (which is also the centerline of the front axle). This places the surface 116 normal to the torque load of the differential, which is the most efficient orientation for resisting the torque load.

The illustrated embodiments are for example only, and other configurations of connections are contemplated by the present disclosure. It is to be understood that the male and female locking feature can be either on the engine or the differential. For example, the engine may include the male locking features and the differential may include the female locking features.

The male locking feature may be installed into the female locking feature by a machine that pushes the differential into place or the fasteners 73 may be tighten to seat the male locking feature within the female locking feature.

Figure 7:
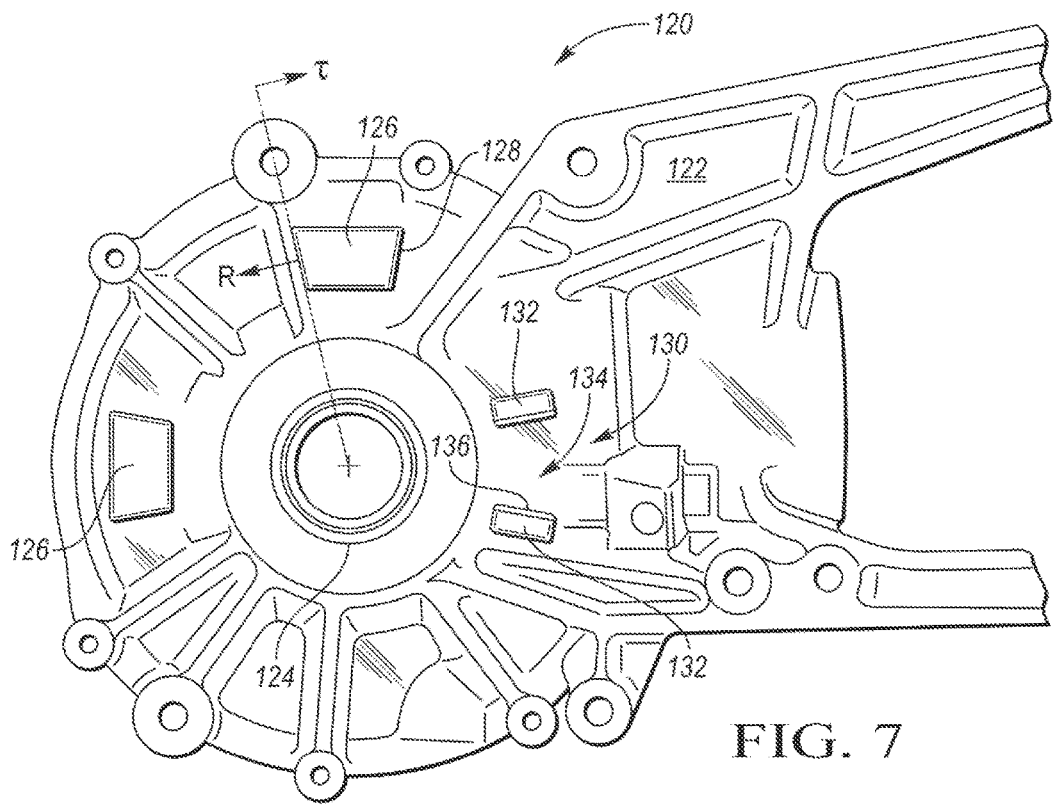
FIG. 7 is a side view of another front differential.

FIG. 7 illustrates another front differential having a housing 120 defining an interior side 122. The housing 120 defines an axle hole 124 that receives the front axle half shaft. An array of locking features is radially arranged around the center of the axle hole 124. The array includes two male locking features 126 and one female locking feature 130. It is to be understood that the array may include more or less of each of the different locking features in other embodiments. Each of the male locking features 126 may project outwardly from the interior side 122 and includes sidewalls extending from a distal end of the locking feature to the exterior side 122. Two, or more, of the sidewalls have exterior engaging surfaces 128 that engaged with corresponding surfaces of the corresponding female locking feature disposed on the engine. At least some of the engaging surfaces 128 may be arranged such that the engaging surfaces 128 provide a reactant force (R) that is normal to a direction of the torque load (T) of the front differential.

The array also includes at least one female locking feature 130 having a pair of arms 132 that projects outwardly from the interior side 122. The arms 132 are spaced apart to define a cavity 134 for receiving a corresponding male locking feature disposed on the engine. Each of the arms defines an interior engaging surface that engages with a corresponding engaging surface on the male locking feature. At least some of the engaging surfaces 136 may be arranged such that the engaging surfaces 136 provide a reactant force normal to a direction of the torque load of the front differential.

Figure 8:
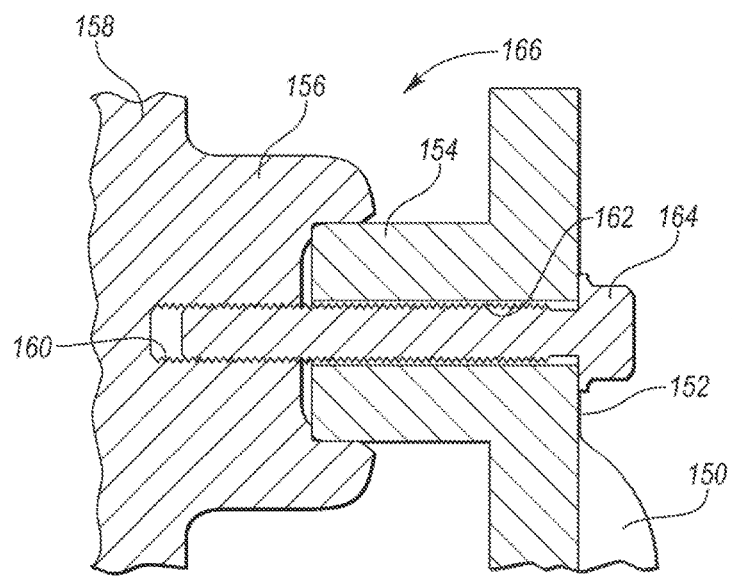
FIG. 8 is a side view, in cross section, of another connection between an engine and a front differential.

Referring to FIG. 8, another front differential 150 includes a housing having a flange portion 152 with a male locking feature 154 extending outwardly therefrom. The male locking feature 154 engages with a female locking feature 156 disposed on the engine 158 to create a connection 166 that at least partially secures the differential to the engine. In this embodiment, at least one of the connections includes not only the male and female locking features but also a fastener 164 that extends through the locking features. The front differential 150 defines a borehole 162 that extends completely through the male locking feature 154. The engine 158 defines a tapped hole 160 that includes an opening located within the base of the female locking feature 156. A fastener 164 extends through the borehole 162 and threads into the tapped hole 160. Having the fastener 164 centered within the locking features may allow for easier assembly of the differential to the engine.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle powertrain comprising:
   an engine including a sidewall that has a first locking feature disposed thereon and defining first opposing mating surfaces;
   a front differential including a second locking feature defining second opposing mating surfaces, the differential being mounted to the engine via the first and second locking features that engage with the first and second mating surfaces disposed against each other; and
   a fastener disposed within the engine and the differential.

2. The vehicle powertrain of claim 1 wherein the first locking feature defines a cavity that receives at least a portion of the second locking feature.

3. The vehicle powertrain of claim 1 wherein the second locking feature defines a cavity that receives at least a portion of the first locking feature.

4. The vehicle powertrain of claim 1 wherein the first locking feature is a female locking feature having a cavity defined between the opposing first mating surfaces, and the second locking feature is a male locking feature projecting outwardly from the differential and having opposing sidewalls that define the opposing second mating surfaces, wherein the male locking feature is disposed within the cavity.

5. The vehicle powertrain of claim 4 wherein the female locking feature further includes first and second arms each defining one of the first mating surfaces and interconnected by a back wall to define the cavity that receives the male locking feature.

6. The vehicle powertrain of claim 1 wherein the second locking feature is a female locking feature having a cavity defined between the opposing second mating surfaces, and the first locking feature is a male locking feature projecting outwardly from the engine and having opposing sidewalls that define the opposing first mating surfaces, wherein the male locking feature is disposed within the cavity.

7. The vehicle powertrain of claim 1 wherein the first locking feature is integrally formed with the engine and the second locking feature is integrally formed with the differential.

8. The powertrain of claim 1 wherein a housing of the front differential defines a half-shaft bore and wherein the second locking feature is vertically aligned with the bore.

9. The powertrain of claim 1 further comprising:
   a transfer case; and
   a driveshaft operable coupled to the front differential and the transfer case.

10. The vehicle powertrain of claim 1 wherein the first opposing mating surfaces frictionally engage with the second opposing mating surfaces to form an interference fit.

11. A vehicle powertrain comprising:
    an engine including an outer side having a female locking feature disposed thereon and defining a pair of projecting arms with internal mating surfaces; and
    a differential operably coupled to a transfer case, and including a housing having a male locking feature projecting therefrom and disposed between the arms with external mating surfaces of the male locking feature engaging the internal mating surfaces to mount the differential to the engine.

12. The vehicle powertrain of claim 11 wherein the female locking feature includes a base disposed on the outer side and the internal mating surfaces extend outwardly from the base.

13. The vehicle powertrain of claim 11 wherein the female locking feature defines a tapped hole and the male locking feature defines a bore hole, and a fastener is disposed within the tapped hole and the bore hole.

14. The vehicle powertrain of claim 11 wherein the female locking feature is integrally formed with the outer side, and the male locking feature is integrally formed with the housing.

15. The vehicle powertrain of claim 11 further comprising at least one fastener disposed within the engine and the differential.

16. A vehicle powertrain comprising:
   an engine including an outer side having a male locking feature projecting therefrom and defining external mating surfaces; and
   a differential coupled to a transfer case by a driveshaft, and including a housing having a female locking feature defining internal mating surfaces, wherein the male locking feature is disposed within the female locking feature such that the male and female mating surfaces engage mounting the differential to the engine.

17. The vehicle powertrain of claim 16 wherein the female locking feature further includes first and second arms interconnected by a back wall to define a cavity that receives the male locking feature, and wherein the internal mating surfaces are located on the arms.

18. The vehicle powertrain of claim 16 wherein the female locking feature includes a base disposed on the housing and the internal mating surfaces extend outwardly from the base.

19. The vehicle powertrain of claim 17 wherein the male locking feature defines a tapped hole and the female locking feature defines a bore hole, and a fastener is disposed within the tapped hole and the bore hole.

* * * * *